United States Patent [19]
Condon

[11] 3,761,816
[45] Sept. 25, 1973

[54] DATA SET EMPLOYING A COMMUTATING CAPACITOR, TRACKING, NOTCH FILTER

[75] Inventor: Joseph Henry Condon, Summit, N.J.

[73] Assignee: Bell Telephone Laboratories, Incorporated, Murray Hill, Berkeley Heights, N.J.

[22] Filed: Sept. 8, 1972

[21] Appl. No.: 287,278

[52] U.S. Cl. ................. 325/22, 325/320, 333/70 A, 333/76
[51] Int. Cl. .......................... H04b 1/10, H03h 7/10
[58] Field of Search .................. 333/70 A, 70 R, 76; 325/473, 477, 12, 17, 21, 22, 25, 302, 304, 320, 396, 421, 427, 489

[56] References Cited

UNITED STATES PATENTS

| | | | |
|---|---|---|---|
| 3,656,162 | 4/1972 | Mee | 343/180 |
| 3,603,898 | 2/1970 | Dawson et al. | 333/70 A |
| 3,375,451 | 3/1968 | Borelli et al. | 333/76 X |
| 3,668,570 | 6/1972 | Lautier et al. | 333/70 A |

*Primary Examiner*—Rudolph V. Rolinec
*Assistant Examiner*—Marvin Nussbaum
*Attorney*—W. L. Keefauver

[57] ABSTRACT

In a data set in which a transmitter and a receiver are required to work at the same time with respect to a bi-directional signal transmission path for communication to another data set, a commutating capacitor unit, band-rejection filter is coupled in the receiver input to be driven for line signal coupling to the receiver by line signals, and driven for capacitor commutation by a signal from the transmitter. That transmitter signal is derived at any given time to cause the filter to suppress a particular transmitter frequency that otherwise would interfere with normal receiver operation.

11 Claims, 2 Drawing Figures

DATA SET EMPLOYING A COMMUTATING CAPACITOR, TRACKING, NOTCH FILTER

BACKGROUND OF THE INVENTION

1. Field of the Invention

This invention relates to signal receivers with input band-limiting filters.

2. Description of the Prior Art

Signal receivers often have the signal input thereto band-limited in order to assure proper receiver operation. An example is a receiver in a data set that works on a bidirectional signal transmission circuit from which signals are received at the same time that the data set transmitter is sending on the same transmission circuit in the opposite direction in a different frequency range. In such situations, it is customary to use a band-limiting filter at the receiver input to assure proper operation. However, special care must be taken to prevent a transmitted signal, which is usually at a much higher amplitude level than a received signal, from riding into the receiver through a fringe portion of the receiver band-limiting filter response characteristic as crosstalk or noise. Usually the bandwidth characteristics of a signal transmission line make it difficult to spread the transmission and reception frequency ranges to a sufficient degree to assure no interference with receiver operation. For example, an ordinary telephone circuit bandwidth is typically less than 4 kilohertz; and in frequency division multiplex systems using broader band circuits, it is desirable to limit the individual channel bandwidth in order to have an economical number of signal channels on a given circuit.

However, if the spread between transmitting and receiving frequency ranges is reduced in favor of transmission circuit economy, the filters required to prevent transmitted signals from interfering with receiver operation in the same data set become very costly in terms of both direct monetary cost and physical space requirements. In order to provide sharp discrimination against transmitter frequencies, it is usually necessary to employ costly precision impedance components and circuit design in both the transmitter frequency source and the receiver band-limiting filter. Such requirements are needed to be certain that the frequency characteristics in both cases are stable and matched. Thus, it is necessary to provide either a receiver low-pass filter with a sharp cutoff and a transmitter frequency source that is sufficiently stable to avoid drift into the fringe of the low-pass filter range; or it is necessary to provide the receiver with a low-pass filter, having softer cutoff characteristic, and a band-rejection filter, notched at the transmitter frequency to be suppressed, along with a transmitter source sufficiently stable so that its frequency of interest remains in the notch of the band-rejection filter.

STATEMENT OF THE INVENTION

The burden of the foregoing problems of signal band-limiting input signals to a receiver is reduced in an illustrative embodiment of the invention in which a commutating capacitor unit band-rejection filter is coupled in the input signal path of the receiver to be driven for receiver coupling by receiver input signals, and to be driven by a signal that is likely to interfere with receiver operation for commutating capacitor connections in the band-rejection filter.

A basic commutating capacitor unit, band-rejection filter of the type here under consideration is disclosed and claimed in my copending application Ser. No. 254,384, filed May 18, 1972, and entitled "Commutating Capacitor Impedance Device."

It is one feature of the invention that the commutating drive signal is a signal derived from a transmitter in a data set which also includes the aforementioned receiver, and which signal is normally produced during receiver operation.

It is another feature that impedance element and circuit designs are relatively low cost designs because the commutating capacitor unit commutation accommodates the potentially-interfering transmitter signal frequency so that the band-rejection filter principal rejection frequency tracks the transmitter frequency even though it should either drift or be intentionally shifted, e.g., as in frequency shift keyed (FSK) operation.

BRIEF DESCRIPTION OF THE DRAWINGS

A more complete understanding of the present invention and the various features, objects, and advantages thereof may be obtained from a consideration of the following detailed description in connection with the appended claims and the attached drawing in which:

DETAILED DESCRIPTION

Figure 1:
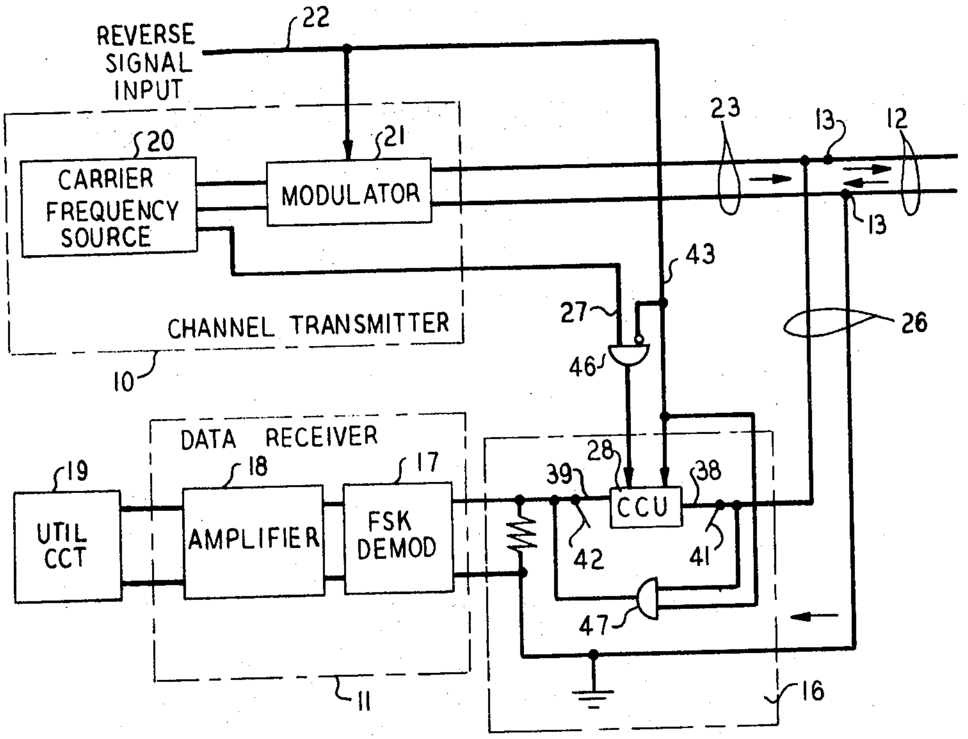
FIG. 1 is a simplified block and line diagram of essential parts of a data set utilizing the present invention.

In the data set of FIG. 1 a reverse channel transmitter 10 and a data receiver 11 work with respect to the same physical bidirectional signal transmission circuit 12, in different frequency ranges, for communicating with another data set (not shown). The present invention is described in connection with a data set in which the transmitter 10 supplies an on-off type of signal at a relatively low frequency, e.g., 387 hertz, which is interrupted by circuits, not shown, to indicate to the other data set that something is amiss in the reception of signals from the latter data set. However, the application of the invention is not so limited. For the embodiment indicated in FIG. 1, the data set would also include, for example, circuits such as a data signal transmitter and a reverse channel signal receiver, which is responsive to the reverse channel transmitter signal of the other data set, which are not shown.

When the data set of FIG. 1 is operating in a receiving mode, it advantageously receives FSK signals of 1,200 hertz or 2,200 hertz as binary ONE and ZERO signals. These FSK signals are coupled from a bidirectional data set coupling connection, schematically represented by terminals 13, through a commutating capacitor band-rejection filter 16, which will be subsequently described, into an FSK demodulator 17. In some applications it is advantageous to employ a hybrid coupling transformer for the mentioned bidirectional coupling connection. Baseband data signals from the demodulator are applied through an amplifier 18 to a utilization circuit 19. The demodulator 17 advantageously includes circuits, not separately shown, for accomplishing the usual band-limiting function with a filter having a relatively soft cutoff response characteristic so that its manufacture is relatively inexpensive.

In transmitter 10 a carrier frequency source 20 supplies the aforementioned 387 hertz signal to a modulator 21 that is controlled by a reverse channel input signal provided on a circuit 22. In the illustrative embodiment wherein the transmitter 10 provides only an "all seems well" type of signal, the modulator 21 is advantageously simply a gate of any well-known type for coupling the output of source 20 through a circuit 23 and the terminals 13 to the transmission circuit 12. If the receiver 11 encounters some predetermined type of trouble, such as a parity error in received data, included logic, (not shown) applies to the circuit 22 a logical ONE signal for operating modulator 21 to cut off the oscillator 20 from the circuit 23. The absence of this reverse channel signal is detected at the other data set and initiates predetermined procedures for remedying the difficulty.

However, when the output of source 20 is being applied to the circuit 12, a certain amount of the transmitted signal energy is coupled through an input circuit 26 to the band-rejection filter 16. The amplitude and phase of this portion of the output signal from transmitter 10 which does not reach circuit 12, is however of an undetermined amplitude and phase because the circuit 12 is usually connectable in a switched transmission system, and its input impedance characteristics are therefore different from time to time. Although this type of variable would make it difficult, at least, to reduce the effect of the transmitter signal in circuit 26 by feeding across a portion of the transmitter output in a separate circuit to buck out the portion in circuit 26, the problem is easily met with the operation of the commutating capacitor filter 16. To this end, an oscillator signal of appropriate frequency is coupled from transmitter 10 on a circuit 27 for providing the commutating drive signal to a commutating capacitor unit 28 in the filter 16. (Circuit 27, and certain other circuits in FIG. 1, perform a control type of function and are indicated in only single-line format.) The unit 28 is advantageously of the type disclosed and claimed in my aforementioned application and is illustrated in simplified form in FIG. 2 herein.

Figure 2:
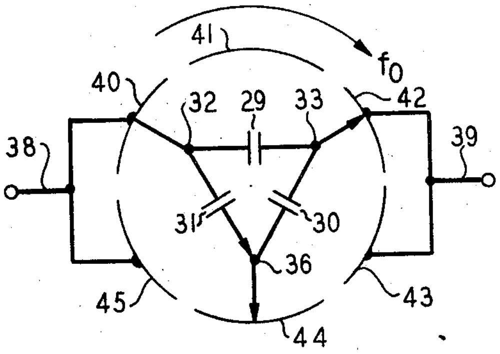
FIG. 2 is a simplified schematic diagram of a commutating capacitor unit of the type described in my aforementioned application and which is useful in the present invention.

In FIG. 2 three capacitors 29,30, and 31 of substantially the same capacitance are interconnected in a delta circuit configuration having delta apex terminals 32, 33, and 36. Those terminals are connectable to an input connection 38 and an output connection 39 by way of six communicating switch segments 40, 41, 42, 43, 44, and 45. Input connection 38 is connected to both of the switch segments 40 and 45; and output connection 39 is similarly connected to switch segments 42 and 43. The circular arrangement of switch segments 40 through 45 is intended to indicate schematically that the delta connection of capacitors is rotatable by means (not shown) for sequentially contacting different sets of three segments which are alternately disposed in the circular sequence illustrated in the drawing. Thus, terminals 32, 33, and 36 are shown in contact with switch segments 40, 42, and 44, respectively. In the next clockwise sequential rotation position they would contact segments 41, 43, and 45. In a third interval of rotation, the even numbered commutating switch segments are once again contacted by the delta terminals, but now those terminals 32, 33, and 36 are in contact with the segments 42, 44, and 40, respectively.

It will be appreciated that, as the delta circuit is rotated, one of the capacitors thereof is directly connected between input connection 38 and output connection 39; and the remaining two capacitors are connected in series across that one capacitor. Thus, as the delta circuit is rotated, the function of each capacitor in that circuit changes with respect to the input and output connections 38 and 39 in each of the six possible positions of the delta circuit. As indicated in FIG. 2, it is assumed that the delta circuit is rotated in a clockwise direction through its sequence of positions, and it is further assumed that such sequence is repeated with a frequency $f_0$. In other words, the capacitor connections are commutated at the frequency $f_0$. This commutation is advantageously achieved by electronic means; and one such means, illustrated in my aforementioned application, comprises an array of six IGFET transistors controlled by six outputs from a five-stage, partially reentrant, shift register which is driven by a shift pulse train having a pulse repetition rate of $6f_0$. Such a $6f_0$ signal is advantageously provided by source 20 on the circuit 27, with $f_0$ being the aforementioned 387 hertz signal.

In the course of normal receiver operation, the signals on circuit 27 provide commutating drive to the unit 28 which is connected in series in the receiver input signal path to provide therein a band-rejection filter characteristic which has a principal rejection frequency response at the frequency $f_0$. A commutating capacitor unit produces certain limited harmonic effects. If the $f_0$ frequency is above the receiver signal passband there is no problem. If $f_0$ is below that band, it is usually the case, and if these effects lie in the band, they must be suppressed. For the illustrative frequencies hereinbefore cited, the fifth harmonic of the transmitted 387 hertz signal is a signal at 1,935 hertz, which is within the input data signal band for the receiver 11. In order to suppress harmonic effects at that frequency, at least one additional commutating capacitor unit, having similar response and harmonic effects, is connected in parallel with the unit 28 as schematically indicated by the diagonal lead portions 41 and 42 in the filter 16. For the case of parallel commutating capacitor units, circuit 27 schematically represents N circuits for providing the $6f_0$ signal in N different phases, 60°/N apart, for the N units, respectively. This technique for suppressing harmonic effects is disclosed and claimed in a copending application of L. G. Bahler and J. H. Condon (Case 1-6) Ser. No. 274,488, filed July 24, 1972, and entitled "Band-Rejection Filter Using Parallel Connected Commutating Capacitor Units," and which is assigned to the same assignee as the present application. An operational amplifier, which is advantageously employed for current summing purposes in the Bahler et al. application, is not specifically indicated in FIG. 1 herein.

In the course of normal data set operation, the $6f_0$ signal on circuit 27 commutates capacitor connections in unit 28 at the frequency $f_0$ for suppressing any signal at that frequency which may be coupled into the circuit 26 from the circuit 23. However, if a binary ONE logic signal is applied to the reverse channel signal input circuit 22, modulator 21 terminates the output from transmitter 10. The same logic signal is extended on a further circuit 43 for performing additional control functions with respect to the filter 16 for reducing transient effects. Thus, if unit 28 were permitted to continue operation in the absence of output from transmitter 10 to circuit 23, the capacitors of the unit would become discharged insofar as the 387 hertz signal is concerned. This means that a short but finite time would be required upon reinitiation of the transmitter output to recharge those capacitors; and during that short interval, a burst of noise could enter receiver 11. In order to reduce the likelihood of this occurrence, the binary ONE signal on circuit 43 is coupled to an inhibiting input connection of a coincidence gate 46 that is provided for coupling the circuit 27 to the unit 28. Thus, the commutating drive signal is thereby discontinued. The same binary ONE signal is also applied to the unit 28 for employment therein to reset the aforementioned partially reentrant shift register to the all zero state, so that all of the IGFET, commutating switch transistors are disabled; and the terminals 32, 33, and 36 of the capacitor delta connection are thereby disconnected from the connections 38 and 39. Consequently, the delta connection is isolated from both the receiver 11 input connection and the terminals 13. This reduces substantially the rate at which charge can leak off of the capacitors 29–31, although a certain amount of charge equalization does take place within the delta connection per se.

In order to avoid interruption of the input signal flow to the receiver 11 while the delta circuit is disconnected, the binary ONE signal on circuit 43 is also applied to enable a coincidence gate 47 for bypassing the commutating capacitor units. Upon resumption of normal transmitter operation in response to the removal of the binary ONE signal from the circuit 22, modulator 21 recouples source 20 to circuit 23. The inhibiting signal is removed from gate 46, and gate 47 is disabled. Thus, the unit 28 resumes its previous normal operation.

If transmitter 10 were a data transmitter for FSK signals, the functions of source 20 and modulator 21 are merged, as is known in the art; and the signals applied to circuit 27 from the transmitter 10 are six times the ONE frequency and six times the ZERO frequency at appropriate times. In this case, however, the unit 28 operates substantially continuously and the gates 46 and 47 are not required. It is necessary, of course, that the set of ONE and ZERO frequencies assigned to the transmitter 10 be different from the set of ONE and ZERO frequencies at which the receiver 11 is operated. It is further advantageous in this type of arrangement, where both the transmitter and receiver are operated in the FSK mode at the same time, that the transmitted signal bit rate be substantially lower than the lowest of the frequencies in the receiver set of ONE and ZERO frequencies.

Although the present invention has been described in connection with particular applications thereof, it is to be understood that additional applications, embodiments, and modifications which will be obvious to those skilled in the art are included within the spirit and scope of the invention.

I claim:

1. In combination, a signal receiver operable for signals in a predetermined frequency range, a commutating capacitor band-rejection filter connected in an input of said receiver and having a principal band-rejection frequency at the frequency of commutation of capacitor connections in said filter, such filter including an input connection and an output connection, a plurality of capacitors connected with one another in a circuit having a predetermined number, greater than two, of terminals, and means for coupling the terminals of different paired combinations of said terminals between said input connection and said output connection in series in the input of said receiver, and means for coupling to said filter a signal for commutating capacitor connections in said filter in a predetermined frequency range for causing said principal band-rejection frequency to track the frequency of said signal in the last-mentioned range.

2. In combination, a signal receiver operable for signals in a predetermined frequency range, a commutating capacitor band-rejection filter connected in an input of said receiver and having a principal band-rejection frequency at the frequency of commutation of capacitor connections in said filter, and means for coupling to said filter a signal for commutating capacitor connections in said filter in a predetermined frequency range for causing said principal band-rejection frequency to track the frequency of said signal in the last-mentioned range, said coupling means comprising means for producing data signals modulated so that said signals include at least one principal frequency component $f_0$ in said last-mentioned range and which component is at a frequency which is substantially higher than the information bit rate of said data signals, and means for coupling to said filter a signal for commutating capacitor connections therein at said principal frequency component.

3. The combination in accordance with claim 1 in which said coupling means comprises a circuit for coupling, as said commutating signal, a signal for commutating capacitor connections at a frequency $f_0$ above said receiver signal range.

4. The combination in accordance with claim 1 in which said coupling means comprises a circuit for coupling, as said commutating signal, a signal for commutating capacitor connections at a frequency $f_0$ below said receiver signal range.

5. The combination in accordance with claim 1 which further comprises a bidirectional signal coupling connection, means for coupling data signals to said coupling connection, and means for coupling an input of said receiver to receive signals from said coupling connection through said filter.

6. The combination in accordance with claim 2 in which said data signals comprise a frequency shift keyed signal wave including at least first and second principal signal frequency components in said last-mentioned range for representing said data signals, and said coupling means includes means for applying a predetermined harmonic of each of said first and second components to said filter for commutating capacitor connections therein.

7. In combination, a signal receiver operable for signals in a predetermined frequency range, a commutatable capacitor band-rejection filter connected in an input of said receiver and having a principal band-rejection frequency at the frequency of commutation of capacitor connections in said filter, and means for coupling to said filter a signal for commutating capacitor connections in said filter in a predetermined frequency range for causing said principal band-rejection frequency to track the frequency of said signal in the last-mentioned range, said filter comprising a plurality of commutatable capacitor units, means for connecting said units in parallel-connected branch paths which are connected in series in the input of said receiver, all of said units having a common principal band-rejection frequency which is below said range for said receiver, and each of said units individually further having harmonic effects in said range of said receiver, and said commutating signal coupling means includes means for driving said units in predetermined different phases.

8. In combination, a signal receiver operable for signals in a predetermined frequency range, a commutatable capacitor band-rejection filter connected in an input of said receiver and having a principal band-rejection frequency at the frequency of commutation of capacitor connections in said filter, and means for coupling to said filter a signal for commutating capacitor connections in said filter in a predetermined frequency range for causing said principal band-rejection frequency to track the frequency of said signal in the last-mentioned range, said coupling means comprising means for generating a signal in said last-mentioned range, said signal comprising an on-off-modulated signal wave wherein the signal frequency during an on interval is in said last-mentioned range, and said generating means includes means for applying a predetermined harmonic of said on-interval frequency to said filter as said commutating signal.

9. The combination in accordance with claim 8 in which said generating means includes means, operative during an off-interval of said generating means signal, for disabling said filter.

10. The combination in accordance with claim 9 in which said disabling means comprises means for selectably bypassing any commutatable capacitor unit of said filter, means for selectively isolating capacitors of any commutatable capacitor unit of said filter from the remainder of said filter, and means for selectably inhibiting said harmonic applying means.

11. A data set comprising a transmitter operatable on at least one predetermined frequency produced by a clock source within the transmitter, a receiver operable for receiving signals over a predetermined frequency band which substantially excludes frequencies produced by said transmitter, a commutatable capacitor band-rejection filter connected in an input of said receiver, said filter including an input connection and an output connection, a plurality of capacitors connected with one another in a circuit having a predetermined number, greater than two, of terminals, and means for coupling the terminals of different paired combinations of said terminals between said input connection and said output connection in series in the input of said receiver, and means for driving said filter in response to an output signal from said clock source for causing the rejection band of said filter to track said frequency of said transmitter.

* * * * *